Figure 1:
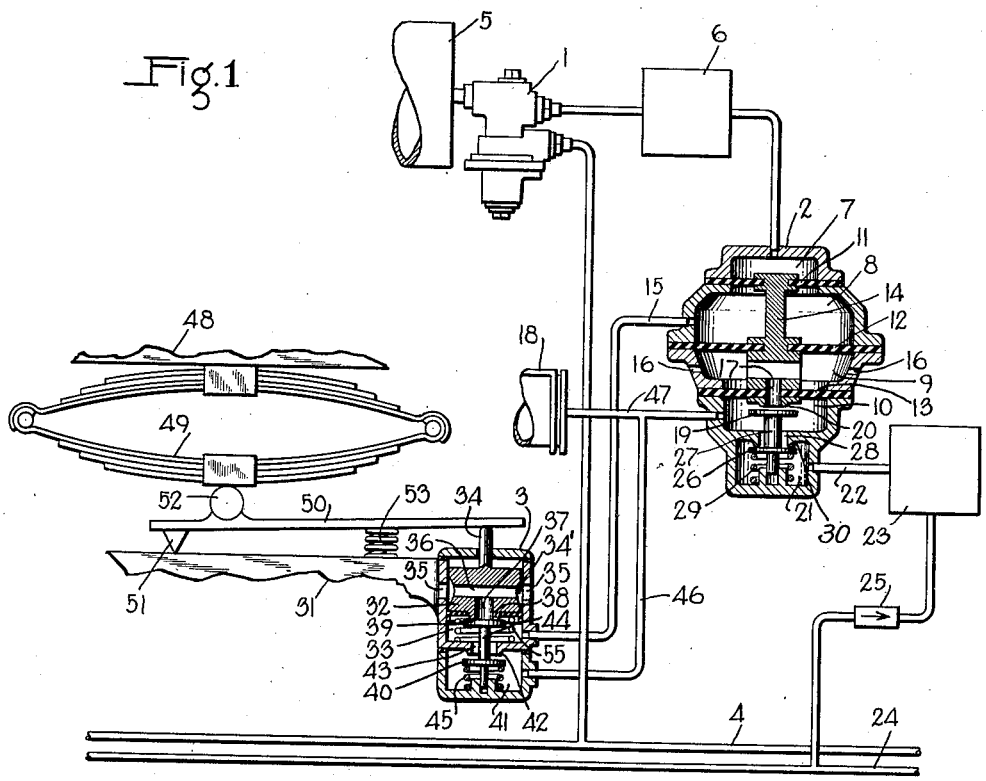

Sept. 26, 1939.  R. BORDE ET AL  2,173,928
FLUID PRESSURE BRAKE
Filed Oct. 26, 1937

INVENTORS
RAOUL BORDE
ANSELME NEVEU
BY
Wm. M. Cady
ATTORNEY

Patented Sept. 26, 1939

2,173,928

UNITED STATES PATENT OFFICE 2,173,928

FLUID PRESSURE BRAKE

Raoul Borde, Paris, and Anselme Neveu, Livry-Gargan, France, assignors, by mesne assignments, to The Westinghouse Air Brake Company, Wilmerding, Pa., a corporation of Pennsylvania Application October 26, 1937, Serial No. 171,020
In France December 24, 1936

19 Claims. (Cl. 303—22)

This invention relates to fluid pressure brakes and more particularly to the type in which the degree of application of brakes is adapted to be automatically varied in accordance with a variable operating condition of the vehicle, such as the load carried thereby.

In Patent No. 2,088,185, issued to Raoul Borde, on July 27, 1937, there is disclosed a brake equipment embodying a relay valve device controlled jointly by the pressure of fluid supplied by a triple valve device and that supplied by a load controlled device for providing and maintaining a proportionate pressure in the brake cylinder of a vehicle, the supply of fluid through the load controlled device to the relay valve device being taken from the triple valve device.

In effecting an application of brakes, the triple valve device operates to supply only a predetermined amount of fluid under pressure, dependent upon the degree of reduction in brake pipe pressure, for effecting operation of the relay valve device, and if there should be any leakage of this fluid, a reduction in the controlling pressures on the relay valve device will result with a consequent proportional release of brakes.

Particularly in the descent of long grades, it is at times necessary to hold the brakes applied for relatively long periods of time and it is undesirable that the control pressures on the relay valve device become reduced and effect a proportional release of brakes, and one object of the invention is therefore to provide means for obviating this difficulty.

According to this feature of the invention, the fluid supplied by the load controlled device to the relay valve device is not taken from the triple valve device as in the equipment above described, but instead, is taken from the brake cylinder, the pressure in which is maintained against leakage by the relay valve device from a supply reservoir or the like, so that leakage in the load controlled device or pipe connections thereto will not have any effect on the control pressures maintained in the relay valve device. In this improved construction, the triple valve device supplies fluid only to a closed chamber in the relay valve device and the possibility of the pressure of this fluid becoming undesirably reduced by leakage is very remote as compared to the construction above referred to.

Another object of the invention is to provide in a brake equipment of the above type, embodying only one brake cylinder, improved means operative in effecting an application of the brakes to supply fluid under pressure to the brake cylinder in two different stages, the initial stage being limited to a relatively low degree, just sufficient, for instance, to effect a gentle gathering of the slack in a train at a time when the slack is stretched out upon initiating the application, and the second stage being adapted to apply the brakes with the required force to decelerate or stop the train, as desired.

Other objects and advantages will be apparent from the following more detailed description of the invention.

Figure 2:
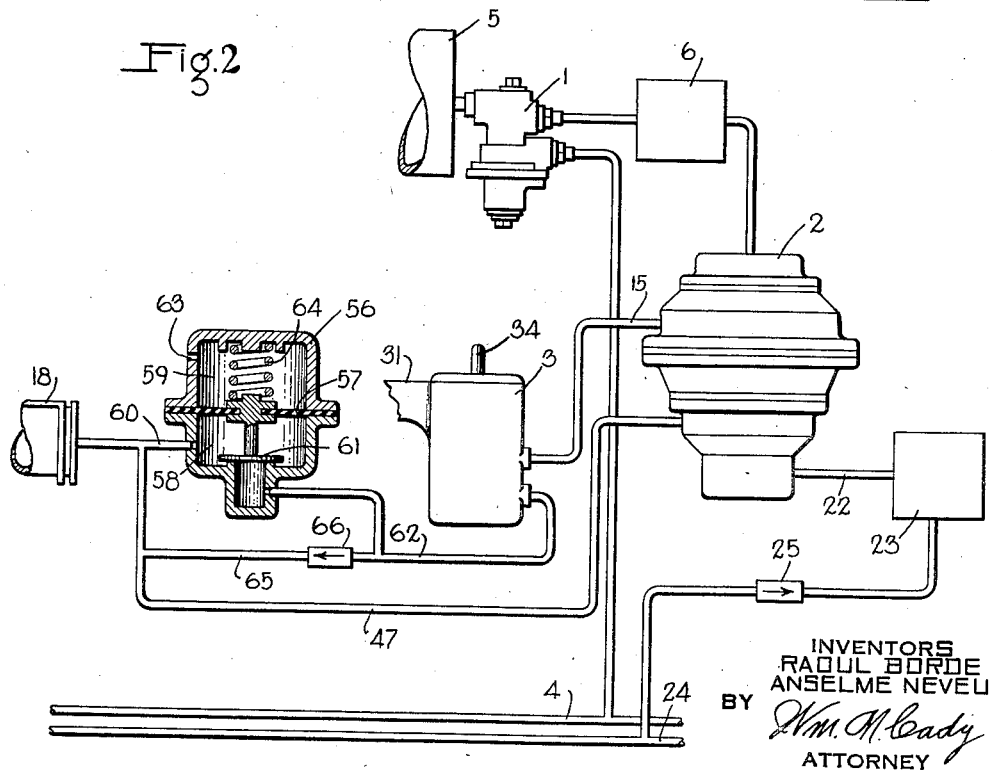

In the accompanying drawing; Fig. 1 is a diagrammatic view, partly in section, of a fluid pressure brake equipment embodying one form of the invention; and Fig. 2 is a view similar to Fig. 1 embodying a modification of the invention.

As shown in Fig. 1 of the drawing, the fluid pressure brake equipment comprises a triple valve device 1, a relay valve device 2 and a modifying valve device 3.

The triple valve device 1 may be of any desired construction adapted to operate upon an increase in the pressure of fluid in a brake pipe 4 to supply fluid under pressure therefrom to an auxiliary reservoir 5 for charging same, and at the same time to connect a volume or reservoir 6 to the atmosphere through the usual brake cylinder connection, while upon a reduction in brake pipe pressure, the triple valve device is adapted to operate to supply fluid from said auxiliary reservoir through said brake cylinder connection to the volume 6 at a pressure depending upon the degree of reduction in brake pipe pressure and therefore the degree with which it is desired to apply the brakes on a vehicle.

The relay valve device 2 comprises a casing divided into four chambers 7, 8, 9 and 10 by means of three spaced diaphragms 11, 12 and 13 which are operatively connected to each other by a stem 14 suitably secured to the diaphragms. These diaphragms may be of any desired areas, but in the embodiment employed for the purpose of illustration, the outer diaphragms are of substantially the same area, while the center diaphragm is of greater area.

The upper chamber 7 is connected to the volume reservoir 6 and thereby to the usual brake cylinder connection of the triple valve device 1. The chamber 8 is connected to a pipe 15 leading to the modifying valve device 3. The chamber 9 is open to the atmosphere through a plurality of ports 16 in the casing and is also open to a passage 17 provided in the stem 14 and leading to chamber 10 which is connected through a pipe 47 to a brake cylinder 18.

A brake cylinder release valve 19 is disposed in a chamber 10 and is adapted to engage a seat rib 20, provided on the stem 14 around the opening of passage 17 to chamber 10, to close communication from said chamber to said passage.

The casing is provided with a chamber 21 which is connected by a passage 28 to chamber 10 and by a pipe 22 to a fluid pressure supply reservoir 23, said reservoir being connected to a train pipe 24 which is normally charged with fluid under pressure and from which fluid under pressure is adapted to flow past a check valve 25 to said reservoir for charging said reservoir.

A brake cylinder supply valve 26 is disposed in chamber 21 and is provided with a stem 27 which loosely extends through passage 28 and engages the release valve 19 in chamber 10. A spring 29 in chamber 21 acts on valve 26 urging said valve into engagement with a seat rib 30 provided around the end of passage 28.

The modifying valve device 3 which is preferably carried by any suitable unsprung portion 31 of the vehicle truck comprises a casing containing a movable abutment preferably in the form of a piston 32 having at one side a chamber 33 connected to pipe 15 and containing a spring 55 acting on said piston. The piston 32 is provided on the opposite face with an actuating member or stem 34 slidably extending through a suitable opening in the casing.

The piston 32 has an annular groove 34' at its periphery open at all times to a plurality of passages 35 extending through the wall of the casing and leading to the atmosphere. A cross passage 36 in piston 32 connects the annular groove 34' to an axial passage 37 leading to chamber 33, an annular valve seat 38 being provided on said piston around the end of said passage in said chamber.

A release valve 39, disposed in chamber 33, is provided to cooperate with seat 38 for controlling communication between said chamber and passage 37. A supply valve 40 is contained in a chamber 41 and is adapted to engage a seat rib 42 provided around the open end of a passage 43 which leads to chamber 33. The supply valve 40 has a stem 44 which loosely extends through passage 43 and engages the release valve 39, and a spring 45 in chamber 41 acts on the supply valve for urging same into engagement with the seat rib 42. The chamber 41 is connected by a pipe 46 to the brake cylinder pipe 47.

The reference character 48 indicates any desired sprung portion of the vehicle, such as its body, which is adapted to be resiliently carried by the unsprung portion 31 of the vehicle in any suitable manner, as by means of a spring 49. A lever 50 is interposed between the spring 49 and the unsprung portion 31 of the vehicle, one end of the lever bearing on said portion through the medium of a knife edge 51, while the opposite end engages the end of stem 34 of the modifying valve device 3. The lever is provided intermediate its ends and close to the knife edge bearing 51 with a cylindrical bearing portion 52 supporting the spring 49. A stop, preferably in the form of a coil spring 53 is interposed between the lever 50 and unsprung portion 31 of the vehicle for preventing excessive movement of said lever and thereby possible injury to the modifying valve device 3 in case of accidental overloading of the vehicle. The modifying valve piston 32 is of such area with respect to the arms of lever 50 as to move said lever in a counterclockwise direction when a fluid pressure is obtained in chamber 33 which is proportional to the load carried, as will be hereinafter described.

In operation, the brake pipe 4 is adapted to be supplied with fluid under pressure through the usual brake valve device (not shown), and from the brake pipe fluid under pressure flows to the triple valve device 1 which moves to its release position in the well known manner and therein charges the auxiliary reservoir 5 with fluid at the pressure in the brake pipe, and also opens the volume reservoir 6 and thereby chamber 7 in the relay valve device 2 to the atmosphere through the usual brake cylinder connection of said triple valve device. The relay valve device then assumes its release position, as will be hereinafter more fully described, in which the release valve 19 is open and the application valve 26 is closed by spring 29.

With the release valve 19 open, the brake cylinder 18 and thereby chamber 41 in the modifying valve device 3 are vented to the atmosphere past said valve, and from thence through port 17, chamber 9 and ports 16 in the relay valve device casing.

The chamber 41 in the modifying valve device 3 is vented through pipes 46 and 47 with the brake cylinder 18, and with said chamber vented the pressure of the load carried by the vehicle on lever 50 acts to hold the piston 32 in the position shown in the drawing in which the valve 39 is seated and the valve 40 unseated, so that the chamber 33 is connected to chamber 41, whereby the chamber 33 and thereby chamber 8 in the relay valve device 2 are also vented with the brake cylinder 18.

If it is desired to effect an application of the brakes, the pressure of fluid in brake pipe 4 is reduced in the usual manner, and the triple valve device 1 operates upon such reduction to supply fluid under pressure to the volume reservoir 6 and to chamber 7 in the relay valve device, the pressure of fluid thus obtained in said reservoir and chamber depending upon the degree of reduction in brake pipe pressure.

The pressure of fluid thus obtained in chamber 7 deflects the diaphragm 11 downwardly thereby moving the stem 14 into seating engagement with the brake cylinder release valve 19. Further movement of the stem 14 then acts through the valve 19 to unseat the brake cylinder supply valve 26 whereupon, fluid under pressure flows from the supply reservoir 23 through chamber 21 into chamber 10 and from thence through pipe 47 to brake cylinder 18 thereby initiating the application of brakes. Fluid under pressure also flows from pipe 47 through pipe 46 to chamber 41 in the modifying valve device 3.

Since valve 40 in the modifying valve device is initially unseated, fluid supplied to chamber 41 flows to chamber 33 and from thence through pipe 15 to chamber 8 in the relay valve device 2 and therein acts on the differential areas of the diaphragms 11 and 12 to increase the force holding the supply valve 26 unseated.

The pressure of fluid supplied to the brake cylinder 18 acts on the diaphragm 13 in opposition to that acting on the diaphragms 11 and 12 and when the brake cylinder pressure becomes built up to a sufficient degree to overcome such opposing pressure, it moves the diaphragm assembly upwardly and permits the spring 29 to seat the valve 26 and thus cut off further flow of fluid to the brake cylinder. In other words, the pressure of fluid obtained in the brake cylinder is dependent upon the pressure of fluid supplied to chamber 7 by operation of the triple valve device and that obtained in chamber 8 through the modifying valve device.

If there should be leakage of fluid under pressure from the brake cylinder 18, the consequent reduction in pressure in chamber 10 on diaphragm 13 will permit the opposing pressures in chambers 7 and 8 to move the diaphragm assembly downwardly to a position in which the supply valve 26 is open just sufficiently to maintain the pressure in said brake cylinder against such leakage.

Fluid under pressure is supplied from the brake cylinder 18 through the modifying valve device 3 to chamber 8 in the relay valve device, as above described, until the pressure of said fluid acting in chamber 33 on piston 32 in conjunction with spring 55 is increased sufficiently to overcome the opposing pressure of the vehicle load on lever 5, at which time said piston is moved upwardly, turning said lever in a counterclockwise direction and permitting spring 45 to seat the supply valve 40 and thereby prevent further flow of fluid under pressure to chamber 8 in the relay valve device.

If for any reason the pressure of fluid in chambers 33 and 8 should become greater than the proper degree for a particular load on the vehicle, due for instance to delay in closing of valve 40 or to reducing the vehicle load at a stop while the brakes are applied, this pressure will cause the piston 32 to move upwardly away from the release valve 39 and permit fluid under pressure to be released from said chambers until the pressure therein is reduced sufficiently for the vehicle load to move said piston back into engagement with the release valve to prevent further release of fluid under pressure.

Leakage of fluid under pressure in the apparatus will not materially affect the pressure of fluid obtained in chamber 8, since any reduction in such pressure will result in the modifying valve piston 32 being operated by the load on the vehicle to unseat the supply valve 40 sufficiently to maintain the pressure in said chamber at the desired degree. It will be noted that the fluid under pressure used for maintaining the pressure in chamber 8 as just described, is drawn from the brake cylinder pipe 47, but this will not affect the pressure in the brake cylinder 18 since the relay valve device 2 will operate to supply fluid under pressure thereto from the supply reservoir 23 for maintaining the pressure therein at the proper degree. This maintaining of the control pressure in chamber 8 from the brake cylinder 18, instead of from the triple valve pipe leading to chamber 7, as in the aforementioned patent, is very important, since leakage of fluid from chamber 8 will have no effect upon the pressure of fluid in chamber 7 and therefore substantially no effect upon the degree of application of the brakes.

From the above it will be noted that the modifying valve device 3 acts in effecting an application of the brakes to provide and maintain in chamber 8 a pressure the degree of which is dependent upon the load carried by the vehicle. In other words, if the vehicle is only partly loaded, a greater fluid pressure is required in chamber 33 to move the modifying valve piston 32 to the position to permit closing of valve 40 than if the vehicle is empty, while a still greater pressure is required to permit such operation of valve 40 if the vehicle is fully loaded, and these different pressures in chamber 8 of the relay valve device 2 acting on the differential areas of diaphragms 11 and 12 causes the relay valve device to provide in the brake cylinder 18 a pressure which is proportional to the load carried by the vehicle.

When it is desired to effect a release of the brakes after an application, the pressure of fluid in brake pipe 4 is increased in the usual manner to operate the triple valve 1 to recharge the auxiliary reservoir 5 with fluid under pressure from the brake pipe, and to connect the chamber 7 and volume reservoir 6 to the atmosphere through the usual brake cylinder release connection.

This venting of fluid under pressure from chamber 7 reduces the downwardly acting pressures on the diaphragm assembly of the relay valve device sufficiently to permit brake cylinder pressure in chamber 10 to move said assembly and thereby the stem 14 out of engagement with the release valve 19 whereupon fluid under pressure is released from brake cylinder 18 through chamber 10, past said release valve to chamber 9 and from thence through ports 16 to the atmosphere.

The pressure of fluid in chamber 41 of the modifying valve device 3 reduces with that in brake cylinder 18 and when reduced sufficiently permits the pressure of fluid in chamber 33 acting on the opposite side of valve 40 to unseat said valve. Fluid under pressure then flows from chamber 33 and the connected chamber 8 to chamber 41 and reduces with brake cylinder pressure.

The valve 40 opens as just described to permit the pressure of fluid in chamber 8 to reduce before the brake cylinder pressure in chamber 10 becomes reduced to a degree where the pressure in chamber 8 would effect closure of the release valve 19, thereby ensuring a complete release of fluid under pressure from the brake cylinder 18.

When the pressure of fluid in chamber 33 of the modifying valve device 3 starts to reduce past the valve 40, such reduction on piston 32 permits the weight of the vehicle acting through lever 50 to return said piston to the position shown in the drawing, in order that the supply valve 40 will be properly conditioned for a subsequent application of the brakes.

If desired, the application and/or release of brakes may be graduated or limited to any chosen degree dependent upon the degree of reduction or increase in brake pipe pressure and the consequent pressure provided in chamber 7 of the relay valve device 2, since said relay valve device will act to provide and maintain a proportional pressure in the brake cylinder 18.

When a vehicle is not loaded, the pressure of fluid obtained through the modifying valve device 3 in chamber 8 of the relay valve device 2 will be relatively low as compared to that obtained when the car is loaded, and as a result the differential of pressures which acts in the relay valve device to hold the brake cylinder supply valve 26 open will reduce quicker when the vehicle is not loaded than when loaded. As a consequence, the supply valve 26 will be held fully open for a shorter period of time when the vehicle is not loaded than when loaded and the rate at which the pressure of fluid will build up in the brake cylinder will therefore be generally slower for an empty vehicle than for a loaded vehicle, and slower for a partially loaded vehicle than for a fully loaded vehicle. In other words, with the equipment above described, the rate at which the brake cylinder pressure will build up in effecting an application of the brakes will increase with an increase in the load carried.

With usual load brake equipments employing two or more brake cylinders, it is customary to supply fluid first to one of the cylinders for effecting operation thereof to take up slack in the brake rigging and possibly providing a relatively light degree of brake application for gathering the slack in a train, after which fluid under pressure is supplied to the other cylinder or cylinders for stopping or retarding the train.

With the usual type of load brake equipment, it will therefore be evident that the braking of a vehicle is effected in two stages, the initial stage of application being obtained by the supply of fluid to the first cylinder and the subsequent stage of application being obtained by the supply of fluid to the second cylinder. In order to obtain substantially this same braking result in a brake equipment of the type disclosed in the drawing embodying only one brake cylinder, a delay valve device 56 may be provided in the connection between the brake cylinder 18 and modifying valve device 3 for delaying the supply of fluid under pressure to chamber 8 in effecting an application of the brakes.

The delay valve device 56 comprises a casing containing a flexible diaphragm 57 dividing the interior of the casing into two chambers 58 and 59.

The chamber 58 is connected to a pipe 60 leading to the brake cylinder pipe 47 and contains a valve 61 secured to and movable with the diaphragm 57 for controlling communication between said chamber and a pipe 62 leading to the modifying valve device 3. The chamber 59 is open to the atmosphere through a port 63 and contains a spring 64 acting on the diaphragm 57 for urging the valve 61 to its seat. A pipe 65 is provided connecting pipe 62 to pipe 47 and contains a check valve 66 arranged to prevent flow of fluid from pipe 47 through pipe 65 to pipe 62, but to permit flow of fluid in the reverse direction.

In operation, the delay valve device 56 is adapted to prevent flow of fluid to chamber 8 of the relay valve device in effecting an application of brakes, until after a predetermined fluid pressure is obtained in the brake cylinder. This predetermined brake cylinder pressure is controlled by the pressure of fluid supplied to chamber 7 by operation of the triple valve device and will be the same regardless of the load carried by the vehicle, and the consequent build up in brake cylinder pressure will be at a relatively slow rate as it approaches the control pressure in chamber 7 and the valve 26 moves towards its seat. However, as soon as sufficient pressure is obtained in the brake cylinder 18 and the connected diaphragm chamber 58 of the delay valve device 56 to overcome the opposing pressure of spring 64 on diaphragm 57, said diaphragm is deflected to unseat the valve 61, whereupon fluid is supplied to the modifying valve device 3 for supply to chamber 8 in the relay valve device which is operated thereby to open wide the brake cylinder supply valve 26 and thus supply fluid to the brake cylinder at an increased rate which gradually reduces as the brake cylinder pressure in said relay valve device approaches the opposing, control pressures acting therein, said relay valve device being operative to limit the degree of pressure obtained in said brake cylinder in accordance with the load carried by the vehicle in the same manner as the equipment disclosed in Fig. 1. In other words, the delay valve device acts to limit the build up in brake cylinder pressure to a predetermined degree regardless of the load carried by the vehicle thus producing a braking effect corresponding to that obtained by the initial brake cylinder cut into action in the usual load equipments. The delay valve device then operates to permit further flow of fluid to the brake cylinder, producing in effect the result accomplished by the supply of fluid to the one or more other cylinders of the conventional type of load equipment.

A release of the brakes after an application is effected in the same manner as in the equipment shown in Fig. 1, fluid under pressure being released from chamber 8 in the relay valve device 2 through the modifying valve device 3 with the release of fluid from the brake cylinder 18. This release of fluid from chamber 8 in the relay valve device occurs past the valve 61 in the delay valve device, until the brake cylinder pressure in chamber 58 is reduced sufficiently for the spring 64 to deflect the diaphragm downwardly and seat valve 61, after which the further release of fluid from chamber 8 occurs past the check valve 66 and through pipe 65 in which said check valve is disposed.

From the above description it will be noted that a brake equipment is provided for effecting an application of brakes the degree of which is automatically varied according to the load carried by the vehicle, and in accordance with the invention leakage in the equipment will have substantially no effect upon the degree with which the brakes are held applied, and by the use of a delay valve device, this improved brake equipment embodying only one brake cylinder, may be arranged to apply the brakes in two stages in order to take up the slack in the brake rigging and, if desired, apply the brakes with a light predetermined force for effecting a gentle gathering of slack in a train before applying the brakes with sufficient force to stop the train or effect desired retardation thereof.

While two illustrative embodiments of our invention have been described in detail, it is not our intention to limit its scope to these embodiments or otherwise than by the terms of the appended claims.

Having now described our invention, what we claim as new and desire to secure by Letters Patent, is:

1. A valve device operable upon an increase in fluid pressure in a chamber for supplying fluid under pressure to effect an application of the brakes and also operable to supply fluid under pressure to effect an application of the brakes according to the degree of fluid under pressure supplied to a second chamber, and a valve means operable according to the degree of a variable operating condition of the vehicle for supplying fluid under pressure to a proportionate degree to said second chamber, the source of fluid pressure for said valve means being the fluid under pressure supplied by said valve device in effecting an application of the brakes.

2. A valve device having two chambers and operative in accordance with variations in fluid pressure in said two chambers to vary the pressure of fluid in a third chamber and thereby the degree of application of the brakes, means for varying the pressure of fluid in one of said two chambers for effecting operation of said valve device to vary the pressure of fluid in said third chamber, and means controlled by a variable operating condition of the vehicle operative only upon fluid under pressure being supplied to said third chamber to vary the pressure of fluid in the other of said two chambers in accordance with said operating condition.

3. In a vehicle brake system, in combination, valve means subject to the cooperative action of opposing fluid pressures in two chambers for controlling the brakes on the vehicle, means operative to vary the pressure of fluid in one of said two chambers for effecting operation of said valve means to control the brakes and to supply fluid under pressure to the other of said two chambers, and means controlled by a variable operating condition of the vehicle operative to limit the pressure of fluid obtained in said other of said two chambers in accordance with the operating condition.

4. In a vehicle brake system, in combination, a brake cylinder, valve means having two chambers and operative upon an increase in fluid pressure in one of said chambers to supply fluid under pressure to said brake cylinder and to the other of said chambers for modifying the effect of the pressure in said one chamber, and valve means controlled by a variable operating condition of the vehicle controlling communication through which fluid is supplied to said other chamber and operative to close said communication when the pressure in said other chamber is increased to a degree according to the operating condition and to open said communication when the pressure in said other chamber is at a lower degree.

5. In a vehicle brake system, in combination, a brake cylinder, valve means operative to supply fluid under pressure to and release fluid under pressure from said brake cylinder, control means controlled by the pressure of fluid in said brake cylinder and the cooperative action of two other fluid pressures for controlling the operation of said valve means, manually controlled means for controlling one of said other fluid pressures, and means controlled by a variable operating condition of the vehicle for supplying fluid under pressure from the brake cylinder to said control means at a pressure which varies according to the operating condition to cooperate with the fluid pressure supplied by said manually controlled means.

6. In a vehicle brake system, in combination, valve means having three chambers and operative in accordance with variations in the pressure of fluid in two or said chambers to vary the pressure of fluid in the third chamber for controlling the application of the brakes on the vehicle, means operative to vary the pressure of fluid in one of said two chambers to effect variations in the pressure of fluid in said third chamber and in the other of said two chambers, and means controlled by a variable operating condition of the vehicle for controlling communication through which fluid under pressure is supplied to said other of said two chambers and operative to close said communication when the pressure of fluid therein corresponds to the operating condition and to open said communication when the pressure of fluid therein is of a lower value.

7. In a vehicle brake system, in combination, valve means operative to supply fluid under pressure to and to release fluid under pressure from a chamber for effecting an application and release of the brakes and comprising three spaced connected movable abutments, one being subject on one side to the pressure of fluid in said chamber and on the opposite side to atmospheric pressure in a chamber open to the atmosphere, another being subject on one side to the pressure in said atmospheric chamber and on the opposite side to the variable pressure of fluid in a modifying chamber, and the third being subject on one side to the pressure of fluid in said modifying chamber and on the opposite side to the pressure of fluid in a control chamber, means for varying the pressure of fluid in said control chamber for controlling the operation of said valve means, and means controlled by a variable operating condition of the vehicle and controlling communication between the first named chamber and said modifying chamber through which fluid under pressure is adapted to be supplied to said modifying chamber upon supply of fluid under pressure to said first named chamber, said means being operative to close said communication when the pressure in said modifying chamber is increased to a degree corresponding to the operating condition.

8. In a vehicle brake system, in combination, valve means controlled by the cooperative action of fluid pressures in two separate chambers for controlling the application and the release of brakes on the vehicle, manually controlled means operative to vary the fluid pressure in one of said chambers for initiating the application of brakes, modifying means for varying the fluid pressure in the other of said chambers in accordance with a variable operating condition of the vehicle and means for delaying the operation of said modifying means.

9. In a vehicle brake system, in combination, valve means controlled by the cooperative action of fluid pressures in two separate chambers for controlling the application and the release of brakes on the vehicle, manually controlled means operative to vary the fluid pressure in one of said chambers, and means controlled by the load on the vehicle and operative after the operation of said valve means is initiated to supply fluid to the other of said chambers at a pressure which varies in accordance with the load.

10. In a vehicle brake system, in combination, a brake cylinder, valve means operative to supply fluid under pressure to and to release fluid under pressure from said brake cylinder, movable abutment means subject to the opposing pressures of fluid in said brake cylinder and in a control chamber and operative when the pressure in said chamber exceeds that in said brake cylinder to supply fluid under pressure to said brake cylinder and when less than in said brake cylinder to release fluid under pressure from said brake cylinder, means for varying the pressure of fluid in said chamber, a valve device controlling communication through which fluid under pressure is adapted to be supplied from said brake cylinder to another chamber to cooperate with that in said control chamber for controlling that in said brake cylinder, a movable abutment subject to the pressure of fluid supplied to said valve means through said communication and to an opposing, variable pressure, and controlled by a variable operating condition of the vehicle, said abutment being operative when the variable pressure exceeds the opposing pressure to operate said valve device to open said communication, and when the opposing pressure substantially equals the variable pressure to effect operation of said valve device to close said communication.

11. In a vehicle brake system, in combination, a brake cylinder, a valve device controlled by the cooperative action of fluid pressures in two chambers and operative upon the supply of fluid under pressure to one of said chambers to supply fluid under pressure to said brake cylinder to initiate an application of the brakes and to supply fluid under pressure to the other of said chambers for modifying the action of the fluid pressure in the one chamber on said valve device and thereby the degree of fluid pressure obtained in said brake cylinder, and means controlled by a variable operating condition of the vehicle controlling the pressure of fluid obtained in said other chamber and operative to vary same in accordance with the operating condition.

12. In a vehicle brake system, in combination, a valve device controlled by the cooperative action of fluid pressures in two chambers for controlling the application of brakes on the vehicle, means for supplying fluid under pressure to one of said chambers for initiating an application of brakes, means for supplying fluid under pressure to the other of said chambers and operative to delay such supply until after a predetermined application of the brakes is effected, and means controlled by a variable operating condition of the vehicle and operative to limit the pressure of fluid supplied to said other chamber in accordance with said operating condition.

13. In a vehicle brake system, in combination, a valve device having two chambers and operative upon the supply of fluid under pressure to one of said chambers to initiate an application of brakes, and upon supply of fluid under pressure to the other of said chambers to increase the degree of application of the brakes, means controlled by a variable operating condition of the vehicle for supplying fluid under pressure to said other chamber at a pressure dependent upon the operating condition, and means controlled by the degree of brake application and operative to delay the supply of fluid under pressure to said other chamber until after a predetermined application of the brakes is effected.

14. In a vehicle brake system, in combination, valve means controlled by the cooperative action of pressure in one chamber and the opposing pressures of fluid in two other chambers for controlling the application of brakes on a vehicle, manually controlled means for varying the fluid pressure in one of said other chambers to initiate the application of brakes, means controlled by a variable operating condition of the vehicle for varying the fluid pressure in the other of said two chambers according to said condition, and means for delaying obtaining on said valve means the fluid pressure controlled by the operating condition until after the manually controlled pressure is increased to a predetermined degree.

15. In a vehicle brake system, in combination, valve means controlled by the cooperative action of fluid pressures in two separate chambers for controlling the application and the release of brakes on the vehicle, manually controlled means operative to vary the fluid pressure in one of said chambers, and means controlled by a variable operating condition of the vehicle and operative after the operation of said valve means is initiated to supply fluid to the other of said chambers at a pressure which varies in accordance with said condition.

16. In a vehicle brake system, in combination, valve means subject to the cooperative action of fluid pressures supplied to two independent chambers for controlling the application of brakes on the vehicle, a source of fluid pressure, means operative to supply fluid under pressure from said source to one only of said chambers for effecting the operation of said valve means to initiate the application of brakes, and means controlled by a variable operating condition of the vehicle operative to supply fluid under pressure to the other of said chambers at a pressure which corresponds to the operating condition for modifying the action of the fluid pressure supply by the first named means.

17. In a vehicle brake system, in combination, a valve device having two separate chambers to which fluid under pressure is adapted to be supplied to control an application of brakes on the vehicle, a source of fluid under pressure, manually controlled means operative to establish a communication connecting said source of fluid pressure to one only of said chambers for supplying fluid under pressure to said one chamber, and means controlled by a variable operating condition of the vehicle operative to supply fluid to the other of said chambers at a pressure which varies in accordance with said condition.

18. In a vehicle brake system, in combination, a valve device having two separate chambers to which fluid under pressure is adapted to be supplied to control an application of the brakes on the vehicle, a reservoir normally charged with fluid under pressure, manually controlled means operative to establish a communication connecting only said reservoir and one of such chambers for supplying fluid under pressure to said one chamber, another reservoir normally charged with fluid under pressure, and means controlled by a variable operating condition of the vehicle operative to supply fluid from said other reservoir to the other of said chambers at a pressure depending upon such condition.

19. In a vehicle brake system, in combination, a valve device having two separate chambers to which fluid under pressure is adapted to be supplied to control an application of the brakes on the vehicle, a source of fluid under pressure, means controlled by a variable operating condition of the vehicle operative to supply fluid under pressure from said source to one of said chambers at a pressure which varies in accordance with the condition, a reservoir normally charged with fluid under pressure, and manually controlled means operative to establish communication connecting only said reservoir and the other of said chambers for supplying fluid under pressure to said other chamber whereby the pressure of fluid in the last named chamber is independent of that supplied by said means to the first named chamber.

RAOUL BORDE.
ANSELME NEVEU.